Sept. 21, 1965  M. L. CRIPE ETAL  3,207,252
AUTOMOTIVE CRUISE CONTROL
Filed June 7, 1963
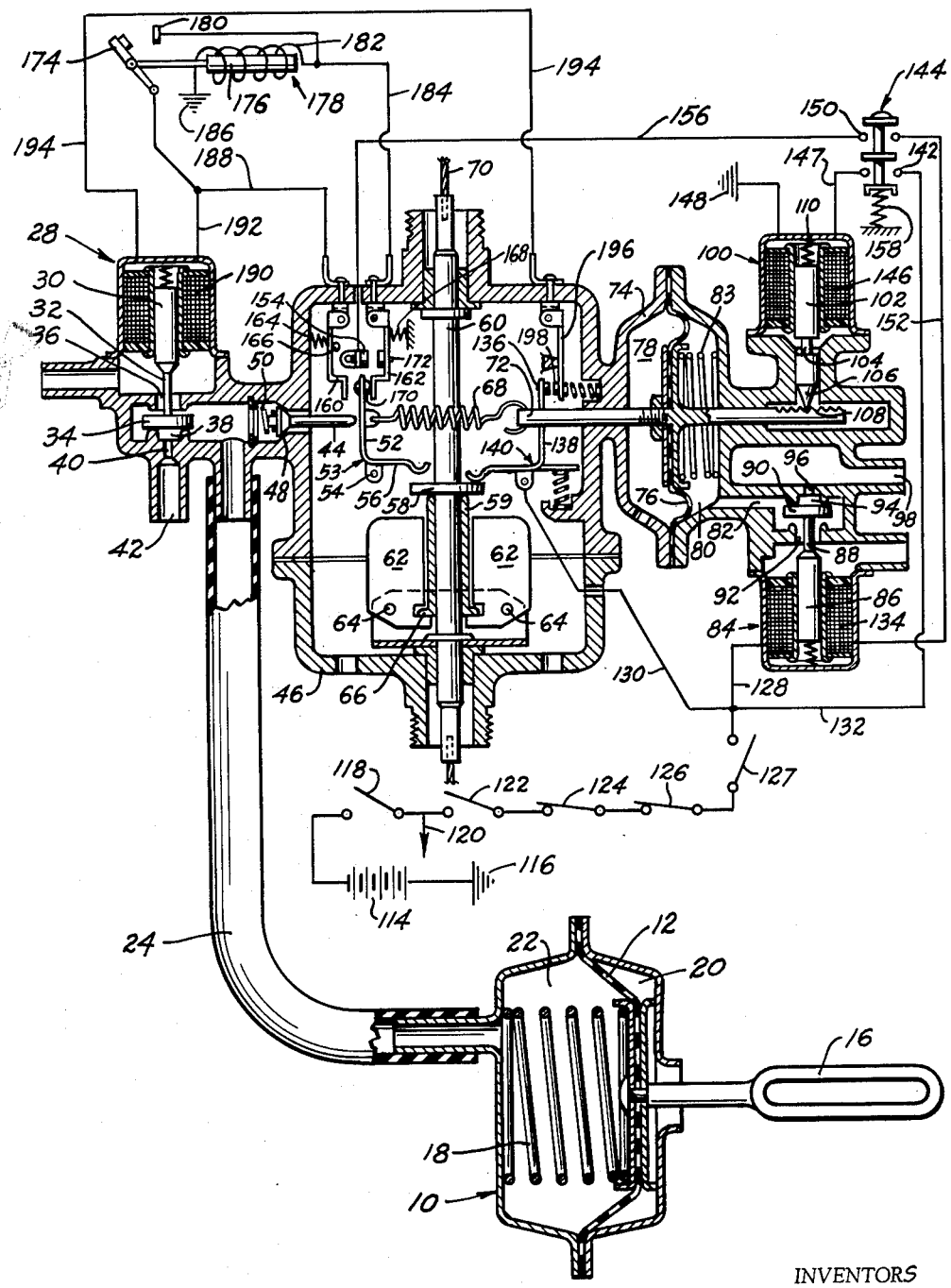
INVENTORS
MAXWELL L. CRIPE
ROBERT R. HAGER.
BY
*William N. Antonis*
ATTORNEY United States Patent Office 3,207,252
Patented Sept. 21, 1965

3,207,252
AUTOMOTIVE CRUISE CONTROL
Maxwell L. Cripe and Robert R. Hager, South Bend, Ind., assignors to The Bendix Corporation, South Bend, Ind., a corporation of Delaware
Filed June 7, 1963, Ser. No. 286,358
5 Claims. (Cl. 180—82.1)

This invention relates to a cruise control system for automatically controlling the speed of an automotive vehicle and more particularly to improvements in a cruise control system of the type disclosed in copending application Serial No. 259,068 which provides for automatic speed selection.

One of the objects of this invention is to provide a cruise control system which does not require a speed selector device in the vehicle passenger compartment.

Another object of this invention is to provide a cruise control system which, after manually accelerating the vehicle to a desired cruising speed, can be rendered operable to automatically maintain the speed of the vehicle at said desired cruising speed solely by actuation of a manually operable push button located in the vehicle passenger compartment.

A further object of this invention is to provide a cruise control system which will in effect remember the last cruising speed at which the cruise control system was operating and permit the driver to render the cruise control system operable at the same speed as said last cruising speed simply by manually accelerating or decelerating the vehicle to said last cruising speed. With such a cruise control system there is no need for the driver to watch the speedometer or push a button each time he wants to lock into a previously acceptable and comfortable cruise control speed.

In other words, it is an object of this invention to provide a cruise control system which permits the driver to render the cruise control system operable at any speed at which the vehicle is traveling simply by actuating a pushbutton or to render the cruise control operable at the last set cruise control speed simply by manually accelerating to said last set cruise control speed at which time the cruise control system will automatically take over.

The above and other objects, features, and advantages of the invention will become apparent from the following description taken in connection with the accompanying drawing which shows a speed control system embodying our invention with the pneumatic and electrical components thereof schematically and diagrammatically illustrated.

Referring to the drawing it will be seen that our speed control system includes a vacuum power unit 10 having a throttle actuator diaphragm 12 therein which is suitably linked to the engine throttle (not shown) through conventional means such as link 16. It will be understood that movement of link 16 to the left will cause the throttle to open and increase the fuel supply to the engine, such movement being against a spring (not shown) which urges the throttle towards a closed position. A spring 18 is located within the vacuum power unit 10 and urges the diaphragm 12 to a throttle released position. The actuator diaphragm 12 has one side thereof 20, continually open to atmosphere while the other side thereof 22, is connected by conduit 24 to a three-way solenoid valve indicated generally by the numeral 28. The solenoid valve includes an armature 30 connected to a valve stem 32 on which is mounted a valve head 34. This valve has an air port 36 and a vacuum port 38 which is suitably connected to the engine intake manifold (not shown) via restriction 40 and conduit 42.

A modulating valve 44 is located in governor housing 46 and is urged against its valve seat 48 by a spring 50. The modulating valve under certain conditions, as hereinafter described, will be unseated from its valve seat by movement of one arm 52 of a V-shaped lever 53 which is pivotally connected to the governor housing at 54. The other arm 56 of the V-shaped lever is positioned above a flange 58 for contact therewith, said flange being formed on a sleeve 59 which is axially movable on governor shaft 60. Also located within the governor housing are a pair of conventional centrifugal weights 62 which are operatively connected to a rotatable governor shaft in a suitable manner so that a predetermined speed will cause outward movement of the centrifugal weights about pivotal connections 64, said outward movement causing axial movement of sleeve 59 and flange 58 through contacting collar 66 which is formed on the other end of sleeve 59. Such axial movement of the sleeve 59 will bring flange 58 into contact with lever arm 56 and will cause lever 53 to pivot about pivotal connection 54, thereby bringing lever arm 52 into contact with the modulating valve 44 and causing said valve to be unseated. Pivotal movement of V-shaped lever 53 about connection 54 is opposed by a governor tension spring 68, one end of which is suitably connected to lever arm 52, and the other end of which is suitably connected to an axially movable rod 72. The tension of spring 68 is determined by the position of rod 72, said position being controlled in a manner to be subsequently described. The governor shaft 60 is suitably connected to a flexible shaft 70 which is adapted to be driven in timed relation with the speed of the vehicle, said flexible shaft preferably being the speedometer drive cable of the vehicle.

As previously stated, outward movement of the centrifugal weights 62 is opposed by the tension of governor spring 68 on arm 52 of lever 53. The force exerted by this spring determines the vehicle speed at which lever arm 52 will unseat modulating valve 44 and thus permit vacuum chamber 22 of power unit 10 to communicate with the atmosphere. The force exerted by spring 68 is determined by a pneumatic system which controls the position of rod 72.

Specifically, this pneumatic system includes a governor loading cylinder 74 having a diaphragm 76 therein which is suitably connected to rod 72 so that movement of the diaphragm will cause concomitant movement of the rod. One side of diaphragm 76, namely chamber 78, communicates continually with the atmosphere, whereas the other side of the diaphragm, namely chamber 80, is connected by passage 82 to a three-way solenoid valve 84, which is similar to solenoid valve 28. A spring 83 urges the diaphragm to the left. Solenoid valve 84 includes an armature 86, a valve stem 88, a valve head 90, an air port 92, and a vacuum port 94 which is suitably connected to the engine intake manifold (not shown) via restriction 96 and conduit 98. Once rod 72 has been moved to the desired position by diaphragm 76, it can be locked in position by a locking solenoid mechanism indicated generally by the numeral 100. This locking solenoid includes an armature 102, a stem 104 having a conical end 106 formed on the end thereof for engaging the serrations 108 formed on the end of rod 72, and a spring 110 which continually urges the conical end 106 into engagement with the serrations 108. In other words, when the locking solenoid is deenergized, conical end 106 is in engagement with the serrations and is, therefore, in a locking position, whereas, when the locking solenoid is energized conical end 106 is drawn away from the serrations and rod 72 and diaphragm 76 are free to move.

The electrical circuit for operating the cruise control system includes a battery 114 having one terminal grounded at 116 and the other terminal connected to an ignition switch 118. Other circuits lead from the ignition switch and are indicated generally by line 120. The cruise control circuit leads from the ignition switch in series to a shift interlock switch 122 which is closed in high gear or drive and open in all other positions of the transmission, continues to a service brake switch 124 and a parking brake switch 126 both of which are normally closed but which will open upon application of their associated brakes and thence to a cruise control switch 127.

From the cruise control switch 127, the cruise control circuit continues through conductors 128, 130 and 132 to coil 134 of solenoid valve 84, movable contact 136 located on arm 138 of pivotal V-shaped lever 140, and to one pole 142 of a double pole pushbutton 144, respectively. Pole 142 is also connected to coil 146 of locking solenoid 100 through conductor 147, said coil being connected to ground at 148. The other pole 150 of the double pole pushbutton is connected to coil 134 of solenoid valve 84 by conductor 152 and to fixed contact 154, which is located in governor housing 46, by conductor 156. A spring 158 urges pushbutton 144 to a position out of contact with poles 142 and 150.

Located within governor housing 46 are two movable switch arms 160 and 162, one of which is urged by spring 164 against a stop pin 166, and the other of which is urged by a spring 168 against contact 170 formed on the end of lever arm 52. Also located on switch arm 162 is contact 172 for engagement with fixed contact 154. Movable contact 174 is controllably linked to armature 176 of relay 178 and is adapted to engage fixed contact 180 when coil 182 of the relay is energized. Fixed contact 180 and coil 182 are suitably connected to switch arm 162 through conductor 184 and coil 182 is also connected to ground at 186. Movable contact 174 is suitably connected to switch arm 160 by conductor 188 and to coil 190 of solenoid valve 28 by conductor 192. Coil 190 in turn is connected by means of conductor 194 to another switch arm 196 having a contact 198 thereon for engagement with movable contact 136 located on the end of lever arm 138.

Operation of the speed control system will be as follows: During manual operation of the vehicle at a given speed, for example 60 m.p.h., ignition switch 118, shift interlock switch 122, service brake switch 124 and parking brake switch 126 will all be closed. If it is desired to place the vehicle under cruise control at the speed at which the vehicle is traveling, namely 60 m.p.h., all that is necessary is to close cruise control switch 127 and to actuate pushbutton 144. When this is done locking solenoid 100 will become energized thereby causing movement of armature 102 and conical end 106 towards spring 110 and away from serrations 108 formed on rod 72. Upon withdrawal of the end 106 from the serrations 108, diaphragm 76 and rod 72 will be free to assume that position which will result in the proper spring force being exerted by the governor tension spring 68 against lever arm 52. With the vehicle traveling at 60 m.p.h., outward movement of centrifugal weights 62 will initially cause pivotal movement of V-shaped lever 140 and engagement of contacts 136 and 198 and subsequently cause pivotal movement of V-shaped lever 53 and engagement of contact 172 with contact 154 and engagement of contact 170 with both of the switch arms 162 and 160. It should be noted that continued engagement between contact 170 and switch arm 162 is maintained until engagement of contacts 154 and 172 because of the force exerted by spring 168, and that such engagement of contacts 154 and 172 while pushbutton 144 is actuated will cause energization of solenoid valve 84 which controls communication of vacuum with chamber 80 of the governor loading cylinder. It should further be noted that engagement of contact 170 with both of the switch arms 160 and 162 will result in energization of solenoid valve 28 regardless of whether or not pushbutton 144 has been actuated and the solenoids 84 and 100 have been energized for reasons to be subsequently explained.

Thus, while traveling at a desired cruise control speed, energization of solenoids 100 and 84 by actuation of pushbutton switch 144 and closure of the aforementioned switches located in the governor housing (closure of which is controlled by the speed of the vehicle), will cause valve head 90 of solenoid valve 84 to move to a position whereby vacuum from the intake manifold will be communicated to chamber 80 via conduit 98, restriction 96 and passage 82. This will result in a differential pressure across diaphragm 76 which will cause movement of the diaphragm and rod 72 to a position which will provide the necessary spring tension force to be exerted by governor spring 68 for maintaining a 60 m.p.h. cruise control speed. Upon release of pushbutton 144 the circuits which permit energization of solenoids 100 and 84 will be broken and conical end 106 will be moved by spring 110 into engagement with serrations 108 so as to retain the diaphragm 76 and rod 72 in that position which is necessary for maintaining a 60 m.p.h. cruise control speed, until such time as the driver desires to change to another cruise control speed.

The pneumatic system for controlling the speed of the vehicle by varying the throttle position is similar to that which is described in copending application Serial No. 184,073, and now abandoned, and is brought into operation by energization of the previously described solenoid valve 28. Such energization causes valve head 34 to block off air port 36 and open vacuum port 38 so that chamber 22 of vacuum power unit 10 will be communicated with vacuum. At this time the resulting differential pressure acting across the diaphragm 12 will cause the diaphragm to move against spring 18 to a position which will maintain the throttle (not shown) through means of link 16, at the necessary setting for maintaining the vehicle at the desired speed. Modulating valve 44, which is controlled by centrifugal weights 62, is responsive to variations in vehicle speed and regulates the degree of vacuum in chamber 22 of power unit 10 by communicating this chamber with atmosphere when it, the modulating valve, is open and preventing communication with atmosphere when it is closed. For example, if the speed of the vehicle increases as it descends a hill, increased movement of the centrifugal weights 62 in an outward direction will cause arm 52 of lever 53 to maintain the modulating valve 44 in an unseated position. Such a valve position will permit a regulated amount of atmospheric pressure to be communicated to the vacuum chamber 22 thereby causing a slight reduction in the amount of vacuum in this chamber. As a result, pressure responsive element 12 will move in a direction tending to close throttle 14 and reduce the fuel supply to the engine and consequently the speed of the vehicle. In effect modulating valve 44 will continually move towards or away from its valve seat 48 as the speed of the vehicle tends to change because of variations in the road conditions.

From the aforementioned description it will be obvious that in this cruise control system the governor tension spring 68 is held at a given set preload position by a spring loaded locking member 106 which engages the notches or serrations 108 on rod 72. Thus, once a cruising speed has been set by engagement of the locking member 106 with rod 72, that setting will be held until a new speed setting is desired. This means that the cruise control in effect has a memory and will lock into the remembered speed any time that the cruise control switch 127 is closed and the car is manually accelerated or decelerated to the last cruise control speed setting. More specifically, with switches 118, 122, 124 and 126 in their closed positions, closure of cruise control switch 127 will cause energization of solenoid 28 and relay 178 through means of a circuit which includes conductor 130, the engagement of contacts 136 and 198 at a speed less than the last set cruise control speed (said contacts 136, 198 constituting a safety switch in the event the speedometer cable breaks), conductor 194, coil 190 of solenoid 28, conductors 192 and 188, the engagement of contact 170 located at the end of lever arm 52 with both switch arms 160 and 162 at substantially the last set cruise control speed, conductor 184, and relay coil 182 which is connected to ground at 186. As previously described, energization of solenoid 28 will cause valve head 34 to move to a position which will permit the communication of vacuum to chamber 22 of power unit 10, said vacuum, that is the amount of vacuum being regulated by the position of modulating valve 44 as determined by the speed of the vehicle. Thus, if the driver wishes to drive under cruise control at the same speed at which he last drove under cruise control, there is no need for the driver to watch the speedometer to bring the vehicle up to the desired speed and push a button each time he wants to lock into cruise control. All that is necessary is to close the cruise control switch 127 and bring the vehicle up to the last set cruise control speed at which time the cruise control system will automatically lock-in by itself.

If a different speed control setting is desired all that the driver need do, as previously described, is to manually accelerate or decelerate the vehicle to the desired speed, close the cruise control switch 127, and push pushbutton 144, at which time rod 72 and diaphragm 76 will be released and the governor loading cylinder pneumatic circuit will be permitted to move the diaphragm 76 to that position which will provide the necessary spring tension force to be exerted by governor spring 68 for maintaining the speed at which the vehicle is traveling at that moment. The diaphragm will remain in a given position so long as the vehicle is traveling at the same speed. However, upon release of pushbutton switch 144, locking member 106 will engage the serrations on rod 72 and the diaphragm will be held in this same position regardless of vehicle speed.

Although the invention has been shown as being operated by vacuum, which is available in the intake manifold of the engine of the vehicle, other pressure fluids which are available in an automotive vehicle may also be utilized: For example, in a vehicle powered by a gas turbine engine, the controlling medium could be compressor pressure rather than manifold vacuum. Accordingly, when the term "fluid pressure" is referred to in the claims, it is intended that such expression be broad enough to cover any suitable fluid pressure which is available in vehicles of this character and to include vacuum.

Furthermore, although this invention has been described in connection with a certain specific embodiment, it will be obvious to those skilled in the art that various changes may be made in the form, structure, arrangement of parts, and electrical circuitry without departing from the spirit of the invention. Accordingly, we do not desire to be limited to the specific embodiment disclosed herein primarily for purposes of illustration, but instead desire protection falling within the scope of the appended claims.

Having thus described the various features of this invention, what we claim as new and desire to secure by Letters Patent is:

1. In a cruise control system for an automotive vehicle having an engine and a driver operated throttle control member for controlling the fuel supply to the engine, a power unit having a pressure responsive element located therein, said pressure responsive element being operatively connected to said throttle control member for controlling movement thereof, fluid pressure means for causing movement of said pressure responsive element, solenoid valve means for communicating said fluid pressure means with said pressure responsive element upon energization thereof, modulating valve means operatively connected to said power unit for regulating and controlling the application of said fluid pressure to said pressure responsive element, speed responsive governor means operatively connected to said modulatig valve means for controlling movement thereof at predetermined speeds, said governor means including a variable governor load spring for determining the speed at which movement of said modulating valve means occurs, a fluid pressure governor loading cylinder having a pressure responsive member therein operatively connected to said governor load spring for varying and setting the effective force exerted by said spring, second solenoid valve means for communicating said fluid pressure means with said pressure responsive member upon energization thereof, locking solenoid means operatively connected to said pressure responsive member for permitting movement thereof when said solenoid is energized and preventing movement thereof when said solenoid is deenergized, and manually operable means for permitting energization of said first and second solenoid valve means and said locking solenoid means.

2. The combination defined in claim 1 wherein said manually operable means is connected to first, second and third electrical control circuits, said first and second circuits including manually operable switch means and being arranged to respectively energize said second solenoid valve means and said locking solenoid means upon closure of said switch means, and said third circuit including governor switch means which upon closure will cause energization of said first solenoid valve means regardless of whether or not the second solenoid and locking solenoid have been energized.

3. The combination defined in claim 2 wherein said governor switch means is operatively connected to said governor load spring and is closed when the vehicle reaches the speed for which the governor load spring is set by the position of the loading cylinder pressure responsive member.

4. The combination defined in claim 3 wherein said loading cylinder pressure responsive member includes a rod fixedly connected thereto and extending therefrom, said rod having serrations formed thereon, and said locking solenoid includes a movable spring loaded plunger which has a first position in which it engages said serrations when the locking solenoid is deenergized to thereby maintain said pressure responsive member in the same position as that which was necessary to maintain the vehicle at the previously set cruise control speed and a second position in which it is disengaged from said serrations when the locking solenoid is energized to permit the loading cylinder pressure responsive member to assume that position which is necessary for setting the effective force exerted by said governor load spring to that value which is required for automatic maintenance of vehicle speed at the speed occurring during actuation of said manually operable switch means.

5. In a cruise control system for an automotive vehicle having an internal combustion engine and a driver operated throttle control member for controlling the fuel supply to the engine, a vacuum power unit having a pressure responsive element located therein, said pressure responsive element being operatively connected to said throttle control member for regulating and controlling movement thereof, passage means for communicating vacuum from the intake manifold of said engine to one side of said pressure responsive element, valve means having a first position for communicating atmospheric pressure to said one side of said pressure responsive element and a second position for preventing communication therebetween, first solenoid means operatively connected to said valve means for causing movement thereof from said first position to said second position upon energization of said first solenoid means, second passage means for communicating atmospheric pressure to said one side of said pressure responsive element, modulating valve means having open and closed positions, said modulating valve means being located in said second passage means for regulating the degree of communication between the atmosphere and said one side of said pressure responsive element via said second passage means, governor means responsive to the speed of the vehicle, said governor means comprising a centrifugally operating weight mechanism for moving said modulating valve to an open position at speeds above a predetermined value, an adjustable governor spring operatively connected to said weight mechanism for determining the speed at which the modulating valve will be moved to an open position by said weight mechanism, a fluid pressure governor loading cylinder having a pressure responsive member therein operatively connected to said governor spring for adjusting and setting the effective force exerted by said governor spring to that value which is necessary for automatic maintenance of vehicle speed at the speed occurring during actuation of said cruise control system, third passage means for communicating vacuum from the intake manifold of said engine to one side of said pressure responsive member, third valve means having a first position for communicating atmospheric pressure to said one side of said pressure responsive member and a second position for preventing communication therebetween, second solenoid means operatively connected to said third valve means for causing movement thereof from said first position to said second position upon energization of said second solenoid means, mechanical locking means operatively connected to said pressure responsive member, said mechanical locking means including a spring loaded plunger having a first position for preventing movement of said pressure responsive member and a second position for permitting movement thereof, third solenoid means operatively connected to said mechanical locking means for causing movement thereof from said first position to said second position upon energization of said third solenoid means, manually operable means for permitting energization of said first, second, and third solenoid means, said manually operable means being connected to first, second and third electrical control circuits, said first and second circuits including a manually operable pushbutton switch means and being arranged to respectively energize said second and third solenoid means upon closure of said pushbutton switch means, said third electrical circuit including governor switch means which upon closure will cause energization of said first solenoid means regardless of whether or not the second or third solenoid means have been energized, said governor switch means being connected to said governor load spring and being closed only when the vehicle reaches the speed for which the governor load spring is set by the position of the loading cylinder pressure responsive member, and a rod fixedly connected to and extending from said loading cylinder pressure responsive member, said rod having serrations formed thereon for being engaged by said spring loaded plunger when said third solenoid means is deenergized to thereby maintain said pressure responsive member in the same position as that which was necessary to maintain the vehicle at the previously set cruise control speed, said rod being released by said plunger upon energization of said third solenoid means to thereby permit said pressure responsive member to assume that position which is necessary for setting the effective force exerted by said governor load spring to that value which is required for automatic maintenance of vehicle speed at the speed occurring during actuation of said manually operable pushbutton switch means.

References Cited by the Examiner

UNITED STATES PATENTS

| | | | |
|---|---|---|---|
| 3,023,828 | 3/62 | Fuller et al. | 180—82.1 |
| 3,062,310 | 11/62 | McCathron et al. | 180—82.1 |
| 3,081,837 | 3/63 | Fiteny | 180—82.1 |
| 3,092,202 | 6/63 | Harrison | 180—82.1 |
| 3,153,325 | 10/64 | Thorner | 60—52 |

PHILIP ARNOLD, *Primary Examiner.*

A. HARRY LEVY, *Examiner.*